Oct. 7, 1924.   1,510,672
E. A. FALL
PLACARD HOLDER FOR TANK CARS
Filed Feb. 11, 1924   2 Sheets-Sheet 1

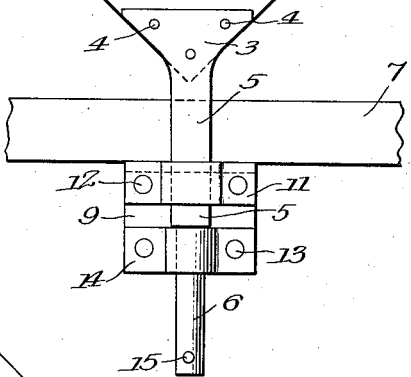

Fig. 1.

INFLAMMABLE
KEEP LIGHTS AND FIRES AWAY
HANDLE CAREFULLY
_____ STATION _____ 192__
1- THIS CAR MUST NOT BE NEXT TO A CAR CONTAINING EXPLOSIVES
2- DO NOT ENTER WITH EXPOSED FLAME OR LIGHTED LANTERN, UNTIL CAR HAS BEEN VENTILATED AND VAPORS ALLOWED TO ESCAPE.
3- WHEN LADING REQUIRING THIS PLACARD IS UNLOADED FROM CAR, THE PLACARDS MUST BE REMOVED.

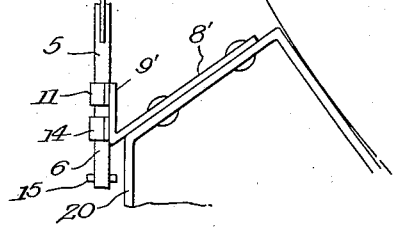

Fig. 8.

EMPTY TANK CAR
INFLAMMABLE VAPOR
KEEP LIGHTS AND FIRES AWAY

Fig. 2.

Inventor
Edward A. Fall
By Cushman, Byrant [signature]
Attorneys

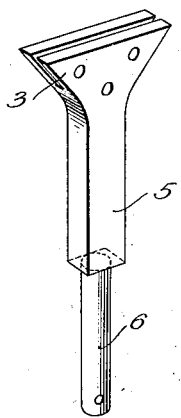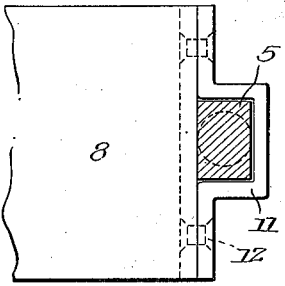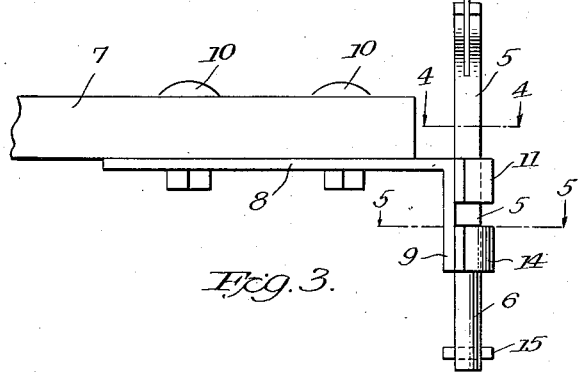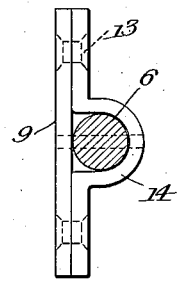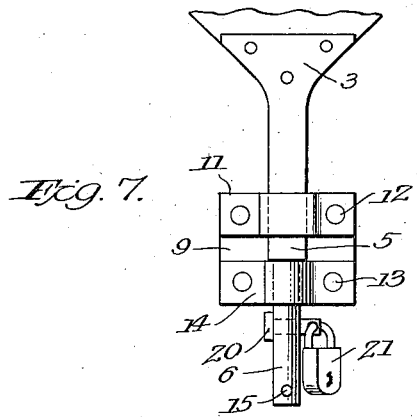

Patented Oct. 7, 1924.

1,510,672

UNITED STATES PATENT OFFICE.

EDWARD A. FALL, OF RUTHERFORD, NEW JERSEY.

PLACARD HOLDER FOR TANK CARS.

Application filed February 11, 1924. Serial No. 692,124.

*To all whom it may concern:*

Be it known that EDWARD A. FALL, a citizen of the United States, residing at Rutherford, in the county of Bergen and State of New Jersey, has invented new and useful Improvements in Placard Holders for Tank Cars, of which the following is a specification.

The present invention relates to an improvement in placard holders, particularly adapted for use with tank cars employed for transporting inflammable and other dangerous fluids.

This application is a division, in part, of my earlier application, Serial Number 643,975.

As pointed out in such earlier application, it was customary, prior to my invention therein set forth, to print the placards, which are required to be displayed when a car is employed for transporting inflammable fluid, on sheets of paper, which were, generally, fastened to a wooden body secured to the car frame. When the tank was emptied, it was customary to destroy the placard and frequently it was replaced by another, calling attention to the fact that while the tank was empty, it was still liable to contain inflammable vapor, and great care should be taken not to expose the same to a flame.

According to the present invention, there is provided a placard support and a holder therefor, which can be securely fastened to the body frame of a tank car, and which will maintain the placard in a proper fixed relation while permitting adjustment of said support so that either of two placards carried thereby will be displayed.

By the present invention the necessary placards may be painted or otherwise displayed on opposite faces of a single metal plate, which can be permanently connected with the placard support and, additionally, means are provided whereby unauthorized persons cannot adjust the parts so that the improper placard will be displayed.

In the accompanying drawings:

Figure 1 is an elevation of one embodiment of the present invention.

Figure 2 is a view of the reverse face of the placard plate from that shown in Figure 1.

Figure 3 is a side elevation.

Figure 4 is a sectional view, on an enlarged scale, on the line 4—4 of Figure 3.

Figure 5 is a similar view on the line 5—5 of Figure 3.

Figure 6 is a view of the body of the placard support detached.

Figure 7 illustrates a slightly different embodiment of the invention.

Figure 8 illustrates another modification.

Referring to the drawings, the device includes a metal plate, shown as being of rectangular form, and having suitable information or placards 1, 2, on its opposite faces. The placard plate referred to is rigidly connected to a suitable support, which is adapted to be connected with a holder on the car body, as will hereinafter be described.

In the drawings, a very simple form of placard support is illustrated, which has been found to be very satisfactory in practical use. This support comprises a body 3 having an integral depending stem or shank and provided in its upper end with a recess or groove adapted to receive the sheet metal placard plate before referred to. The plate and its support are firmly connected, as by suitable rivets 4.

The placard support has a section 5 extending throughout a considerable portion of its length and beyond such section 5, to its free end, the said stem is reduced or of less cross sectional area than the section thereof adjacent the placard plate.

The larger section 5 of the stem of the placard support is preferably made of rectanguler form in cross section, while the lower, reduced, portion 6 is of cylindrical form in cross section.

The placard support is adapted to be connected with a suitable part of a car body frame by a holder which includes a bent sheet metal plate or casting. In the embodiment of the invention illustrated in Figures 1 to 6, where the holder is illustrated as being attached to a horizontal part of the car body frame, for example, a running board, the members 8, 9, of the holder extend substantially at right angles to each other, the horizontally extending member 8 being preferably secured by suitable bolts or other fastening means to the car body frame member 7. On the outer face of the member 9 of the holder is formed a suitable passage, through which the stem or shank of the placard support is adapted to extend. As shown, this passage is provided by a clip 11, which is secured by suitable rivets 12 to the member 9 and is of such shape and size that it will, with said plate 9, closely embrace and surround the larger portion 5 of the placard support.

To the plate 9, below the clip 11, is secured, by suitable rivets 13, another clip 14, which is of such form that it is adapted to closely surround the reduced, cylindrical, portion of the placard support stem. When the stem of the placard support is passed through the passage formed by the clip 11, it will be seen that rotary movement of the placard is positively prevented. The parts are so proportioned that normally the cylindrical portion 6 extends some distance below the lower edge of the plate 9 and the bottom of the clip 14, so that the placard support may be raised sufficiently to carry the enlarged section 5 thereof above the upper surface of the clip 11, and, when in this position, the support may be readily rotated so as to bring the opposite face of the placard plate from that previously displayed into view. A pin 15 is shown extending through the placard support stem near its lower end, and this prevents said support from being entirely disconnected from the holder 8, 9. The pin 15 is, as shown, positioned at such distance below the guide 14 that it does not interfere with the necessary amount of movement in the direction of the length of the placard support stem required to carry the enlarged portion 5 of said stem out of the passage formed by the clip 11.

When the parts are in the position shown in Figures 1 and 3, it will be seen that the lower end of the enlarged portion 5 of the placard support stem rests upon the upper end of the clip 14, which constitutes a guide for the cylindrical portion 6 of the support stem. The parts are so proportioned that there is no danger of the movement of the car shifting the placard support sufficient to disengage it from the passage on the face of the holder, and yet, when desired, the placard and its support may be readily moved upward and rotated so that the reverse placard from that previously displayed will be brought to view.

As shown in Figure 4, the portion 5 of the placard support is not only rectangular in cross section, but such section is of greater length in one dimension than in the other. By reason of such oblong cross sectional form it is necessary to always position the placard so that only one of the faces thereof is visible at one side of the car on which it is mounted. It is, therefore, impossible for a careless attendant to so position the placard that both faces thereof will be partially visible from one side of the car and the support must be arranged in either of two positions separated by an angle of 180 degrees.

In case it is desired to insure that the placard support can only be adjusted by authorized persons, an additional means, such as illustrated in Figure 7, may be provided. As shown in this figure, a removable pin 20 is passed through a suitable hole in the portion 6 of the placard support that extends below the holder, and is fastened in position by any suitable means, as for example, a padlock 21 so that it cannot normally be withdrawn. Obviously fastening means other than the pin and lock construction illustrated can be used and still be within the scope of the invention. In order to adjust the placard support with this addition, it is necessary to unlock and remove the padlock 21 and then withdraw the pin 20 from engagement with the placard support. After this has been done, the support can be readily raised to disengage the larger, polygonal, section 5 from the passage in the holder and bring the cylindrical portion 6 into such passage when the support can be easily rotated as before described.

In the foregoing description it has been assumed that the placard is to be supported from a horizontal surface of the car body frame.

However, it is sometimes preferred to support such placards from an inclined surface, for example a portion of a frame bolster or tank saddle member; and in such case it would not be practicable to employ a holder including a main plate or body of right angle form.

An embodiment of the present invention adopted for thus supporting the placard from an inclined surface is illustrated in Figure 8.

In this embodiment of the invention the members 8', 9' of the holder are bent to form an acute angle with each other and the vertically positioned member 9' extends upward from the member 8' which is attached to the inclined surface of the bolster or tank saddle 20.

With this arrangement the clip 11 forming the passage to receive the polygonal section of the stem of the placard holder is adjacent the free end of the member 9'.

It is believed that the operation and advantages of the invention will be readily understood from the foregoing description in connection with the drawings.

It is to be understood that the drawings are to be considered as illustrative, rather than restrictive, of the invention, and that there may be considerable modification of several of the parts without departing from the spirit of the invention. The proportions, also, of the parts may be varied, as desired, and in Figure 8 the tank and supporting part of the form are shown more or less diagrammatically.

Having thus described the invention, what is claimed is:

1. An article of the character described comprising a placard support having an elongated stem or shank which is reduced in cross section beyond a predetermined distance from the body of the support, a holder adapted to be secured to a car and provided with a passage through which the stem of the placard support is adapted to extend, said passage being of such form and dimensions in transverse section as to prevent rotation of the placard support when the larger portion of the stem thereof is within the passage, and means for preventing the stem of the placard support from being detached from the holder while permitting sufficient longitudinal movement thereof to bring its reduced portion within the passage in the holder.

2. An article of the character described comprising a placard support having an elongated stem or shank which is formed at a predetermined distance from the body of the support with a portion of polygonal form in cross section and having between said section and its free end a reduced portion of cylindrical form in cross section, a holder adapted to be secured to a car and provided with a passage through which the stem of the placard support is adapted to extend, said passage being of such form and dimensions in transverse section as to prevent rotation of the placard support when the polygonal portion of the stem of said support is within said passage, and means for preventing the stem of the placard support from being withdrawn from the holder while permitting sufficient longitudinal movement thereof to bring the reduced, cylindrical, section of the stem within the passage in the holder.

3. An article of the character described comprising a placard support having an elongated stem or shank which is reduced in cross section beyond a predetermined distance from the body of the support, a holder including an angular plate adapted to have one member attached to a car and provided on the outer face of its other member with means forming with the plate a passage through which the stem of the placard support is adapted to extend, said passage being of such form and dimensions in transverse section as to prevent rotation of the placard support when the larger portion of the stem thereof is within the passage, and means for preventing the stem of the placard support from being withdrawn from the holder while permitting sufficient longitudinal movement thereof to bring its reduced section within the passage in the holder.

4. An article of the character described comprising a placard support having an elongated stem or shank which is reduced in cross section beyond a predetermined distance from the body of the support, a holder adapted to be attached to a car and provided with means adapted to embrace both the larger and reduced portions of the stem of the placard support, the engagement between the holder and larger portion of said stem normally preventing rotation of the placard support, and means connected with the stem of the placard support for preventing the stem from being withdrawn from the holder while permitting sufficient longitudinal movement thereof to carry the larger portion of the stem from engagement with the holder preventing rotation of the placard support.

5. An article of the character described, comprising a placard support having a stem or shank which is of rectangular form in cross section at a predetermined distance from the body of the support and beyond such rectangular portion has a reduced portion, a holder adapted to be secured to a car and provided with a passage through which the stem of the placard support is adapted to extend, the walls of the passage normally engaging opposite faces of the rectangular portion of the stem and preventing rotation of the placard support, and means for preventing the placard support stem from being withdrawn from the holder while permitting longitudinal movement thereof sufficient to bring the reduced section of the stem within said passage.

6. An article of the character described comprising a placard support having an elongated stem or shank which is formed at a predetermined distance from the body of the support with a portion of polygonal form in cross section and having between said section and its free end a reduced portion of cylindrical form in cross section, a holder adapted to be attached to a car and provided with a passage through which the stem of the placard support is adapted to extend, said passage being of such form and dimensions in transverse section as to prevent rotation of the placard support when the polygonal portion of the stem is positioned therein, and with a guide adapted to receive the cylindrical portion of the placard support stem, and means for preventing the placard support being separated from the holder while permitting movement in the direction of the length of the stem sufficient to withdraw the polygonal portion of the stem from the passage of the holder.

7. An article of the character described, comprising a holder adapted to be mounted on a car, a placard support, means connecting said holder and support and permitting a limited axial movement of the placard support relative to the holder and rotary movement of said support when in a predetermined axial relation to the holder while preventing separation of the holder and placard support, and supplemental means for preventing axial movement of the placard support sufficient to establish a rotary relation between the holder and said support.

8. An article of the character described, comprising a holder adapted to be mounted on a car, a placard support, means connecting said holder and support and permitting a limited axial movement of the placard support relative to the holder and rotary movement of said support when in a predetermined axial relation to the holder while preventing separation of the holder and placard support, and supplemental lock controlled means for preventing axial movement of the placard support sufficient to establish a rotary relation between the holder and said support.

9. An article of the character described comprising a placard support having an elongated stem or shank which is reduced in cross section beyond a predetermined distance from the body of the support, a holder adapted to be secured to a car and provided with a passage through which the stem of the placard support is adapted to extend, said passage being of such form and dimensions in transverse section as to prevent rotation of the placard support when the larger portion of the stem thereof is within the passage, means for preventing the stem of the placard support from being withdrawn from the holder while permitting sufficient longitudinal movement thereof to bring its reduced section within the passage in the holder, and supplemental means for preventing unauthorized movement of the placard support to the extent necessary to carry the larger section of the stem from the passage of the holder.

10. An article of the character described comprising a placard support having an elongated stem or shank which is reduced in cross section beyond a predetermined distance from the body of the support, a holder adapted to be secured to a car and provided with a passage through which the stem of the placard support is adapted to extend, said passage being of such form and dimensions in transverse section as to prevent rotation of the placard support when the larger portion of the stem thereof is within the passage, means for preventing the placard support being detached from the holder while permitting sufficient movement longitudinally of the stem to bring the reduced portion of the latter within the passage in the holder, and means detachably connected with the reduced portion of the placard support stem, beyond the holder for preventing such movement of the placard support to the extent necessary to carry the larger section of the stem from the passage of the holder.

11. An article of the character described comprising a placard support having an elongated stem or shank which is of a polygonal form in cross section at a predetermined distance from the body of the support and has a reduced portion at one end of said polygonal section, a holder adapted to be secured to a car and provided with a passage through which the stem of the placard support is adapted to extend, the cross sectional form of said passage being such that the polygonal section of the stem will be engaged and rotation thereof prevented in either of two diametrically opposite positions only, and means for preventing the placard support stem from being withdrawn from the holder while permitting longitudinal movement thereof sufficient to bring the reduced section of the stem within said passage.

12. An article of the character described comprising a placard support having an elongated stem or shank which is of a polygonal form, having two opposed parallel faces, in cross section at a predetermined distance from the body of the support and has a reduced portion at one end of said polygonal section, a holder adapted to be secured to a car and provided with a passage through which the stem of the placard support is adapted to extend, opposite walls of said passage engaging the parallel faces of the polygonal section of the placard stem and preventing rotation of the placard in either of two diametrically opposite positions only, and means for preventing the placard support stem from being withdrawn from the holder while permitting longitudinal movement thereof sufficient to bring the reduced section of the stem within said passage.

13. An article of the character described comprising a placard support having an elongated stem or shank which is of a non-circular form in cross section at a predetermined distance from the body of the support and has a reduced portion at one end of said non-circular section, a holder adapted to be secured to a car and provided with a passage through which the stem of the placard support is adapted to extend, the cross sectional form of said passage being such that the non-circular section of the stem will be engaged and rotation thereof prevented in either of two diametrically opposite positions only, and means for preventing the placard support stem from being withdrawn from the holder while permitting longitudinal movement thereof sufficient to bring the reduced section of the stem within said passage.

14. An article of the character described comprising a placard support having an elongated stem or shank which is of oblong form in cross section at a predetermined distance from the body of the support and a reduced portion at one end of said oblong shaped section, a holder adapted to be secured to a car and provided with a passage through which the stem of the placard support is adapted to extend, opposite walls of said passage engaging opposite faces of the oblong shaped section of said stem and preventing rotation of the placard support in either of two diametrically opposite positions when said section of the stem is within the passage in the holder, and means for preventing the placard support stem from being withdrawn from the holder while permitting longitudinal movement thereof sufficient to bring the reduced section of the stem within said passage.

In testimony whereof I have hereunto set my hand.

EDWARD A. FALL.